Sept. 12, 1967 W. R. TOOKE, JR 3,340,615
METHOD OF AND DEVICE FOR MEASURING THE THICKNESS OF FILMS
Filed Oct. 8, 1963 4 Sheets-Sheet 1

INVENTOR.
WILLIAM R. TOOKE JR
BY
Newton, Hopkins & Jones
ATTORNEYS

Sept. 12, 1967     W. R. TOOKE, JR     3,340,615
METHOD OF AND DEVICE FOR MEASURING THE THICKNESS OF FILMS
Filed Oct. 8, 1963     4 Sheets-Sheet 3

INVENTOR.
WILLIAM R. TOOKE JR.
BY
Newton, Hopkins & Jones
ATTORNEYS

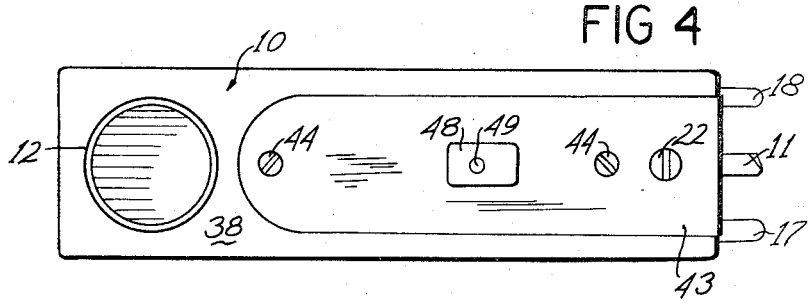
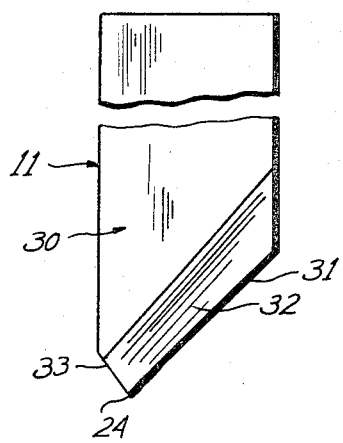
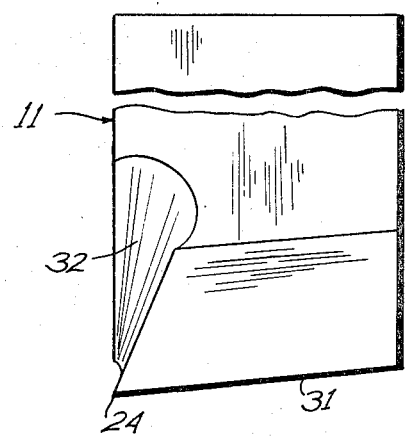
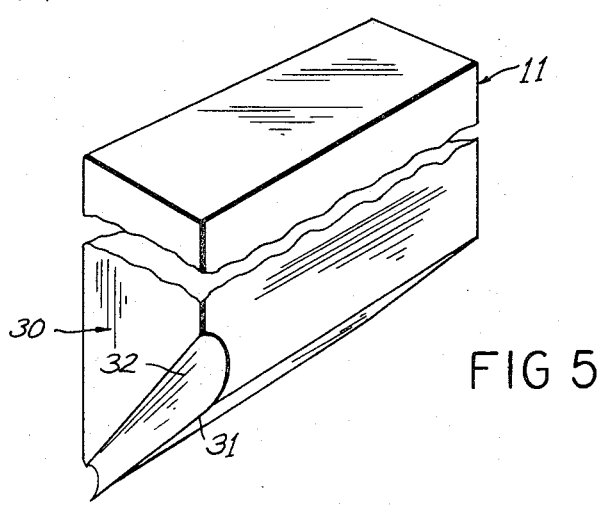

United States Patent Office 3,340,615
Patented Sept. 12, 1967

3,340,615
METHOD OF AND DEVICE FOR MEASURING
THE THICKNESS OF FILMS
William R. Tooke, Jr., Atlanta, Ga., assignor to The
Georgia Tech Research Institute, Atlanta, Ga., a corporation of Georgia
Filed Oct. 8, 1963, Ser. No. 314,678
9 Claims. (Cl. 33—125)

ABSTRACT OF THE DISCLOSURE

Method and device for measuring film thickness comprising forming a groove through the thickness of the film with one side of the groove disposed at a 45 degree angle with respect to the surface of the film, and measuring across the groove in the plane of the surface of the film the apparent width of the exposed portion of the film. A face carrying a cutter is positioned by a pair of studs. Subsequently a face carrying a microscope with a calibrated reticle and illuminating means is positioned by an adjustable bifurcated plate.

Background of the invention

There are many instances in which the determination of the thickness of a film, or of a plurality of layers of material such as paint applied to a substrata such as metal and wood is required. As a result, a plurality of methods and devices have been developed to permit the thickness of materials on substrata to be ascertained. However, all previous methods of and devices for determining the thickness of materials on substrata have been unsuited for use by relatively untrained personnel in a wide variety of circumstances and environments. This is because previous methods have frequently required relatively complicated computations, and because previous devices have been difficult to use; and they have been limited in their adaptability to a wide variety of circumstances and environments.

Summary of the invention

The method of and the device for measuring the thickness of a film, or a layer of material, disclosed herein permit the thickness of a film or layer of material to be ascertained accurately and precisely, without computation and without an elaborate series of operational steps. The device of the invention is small and readily transportable, and is well adapted to quick and easy determination of film thickness under substantially all circumstances and in substantially all environments. In addition, the device of the invention is relatively inexpensive to manufacture, and for this reason, as well as for its ease of operation, the device is particularly suited for use by relatively untrained personnel.

The method of the invention comprises the steps of forming a groove through the film, or layer of material, whose thickness is to be determined, measuring the horizontal distance of the film exposed, and computing the vertical distance through the film by means of the relationship between horizontal and vertical distance. The groove is formed with one side of a known slope, hence the side of the groove can be thought of as the hypotenuse of a right triangle, with the horizontal and vertical distances being the legs of the triangle. The groove is observed through an optical device so calibrated as to convert the horizontal distance measured to the vertical distance desired.

Although the device of the present invention can be used for measuring the widths of grooves, for determining the sizes of imperfections in a film and for other purposes, it is particularly adapted to carry out the method of the present invention.

The device of the invention comprises a cutting tool having a tip shaped to form, in a film or layer of material, a groove having a side sloping in a predetermined manner, means for positioning the cutting tool to insure that the groove is properly and uniformly formed in the film, a source of illumination for illuminating the groove formed in the film, and a microscope having a calibrated reticle for observing the groove formed in the film and for reading the thickness of the film. The relationship between the shape of the tip of the cutting tool which determines the shape of the groove and the calibration of the reticle permits the thickness of the film to be directly read using the device of the invention. Moreover, as long as the proper relationship is maintained between the shape of the tip of the cutting tool and the calibration of the reticle, grooves of various shapes and especially adapted to various materials may be formed in the film or layer of material whose thickness is to be determined.

These and other features and advantages of the invention will be more clearly understood from the following detailed description and the accompanying drawings in which like characters of reference designate corresponding parts in all figures.

Brief description of the drawing

FIG. 4 is a top plan view of the device of the invention showing the upper end of the microscope and the cover plate.

FIG. 5 is a perspective view of an embodiment of the cutting tool used in the device of the invention.

FIG. 6 is an end elevational view of the embodiment of the cutitng tool of the device of the invention shown in FIG. 5.

FIG. 7 is a side elevational view of the embodiment of the cutting tool of the device of the invention shown in FIG. 5.

Figure 1:
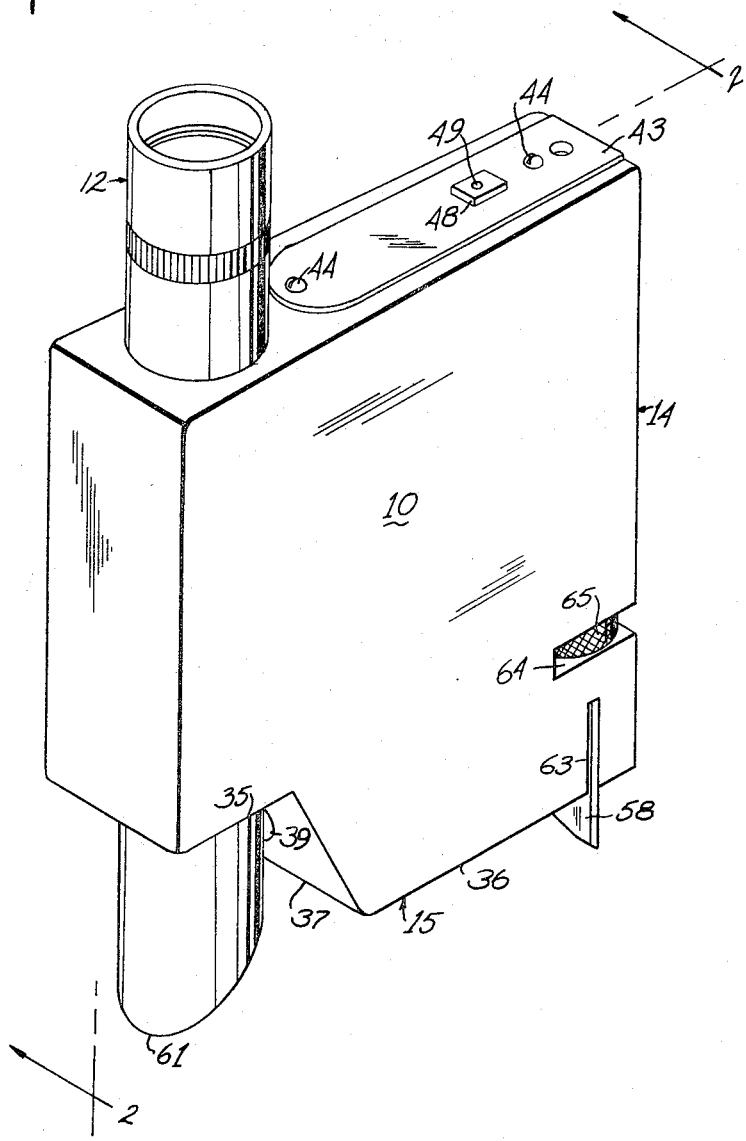
FIG. 1 is a perspective view of the device of the invention.
Figure 2:
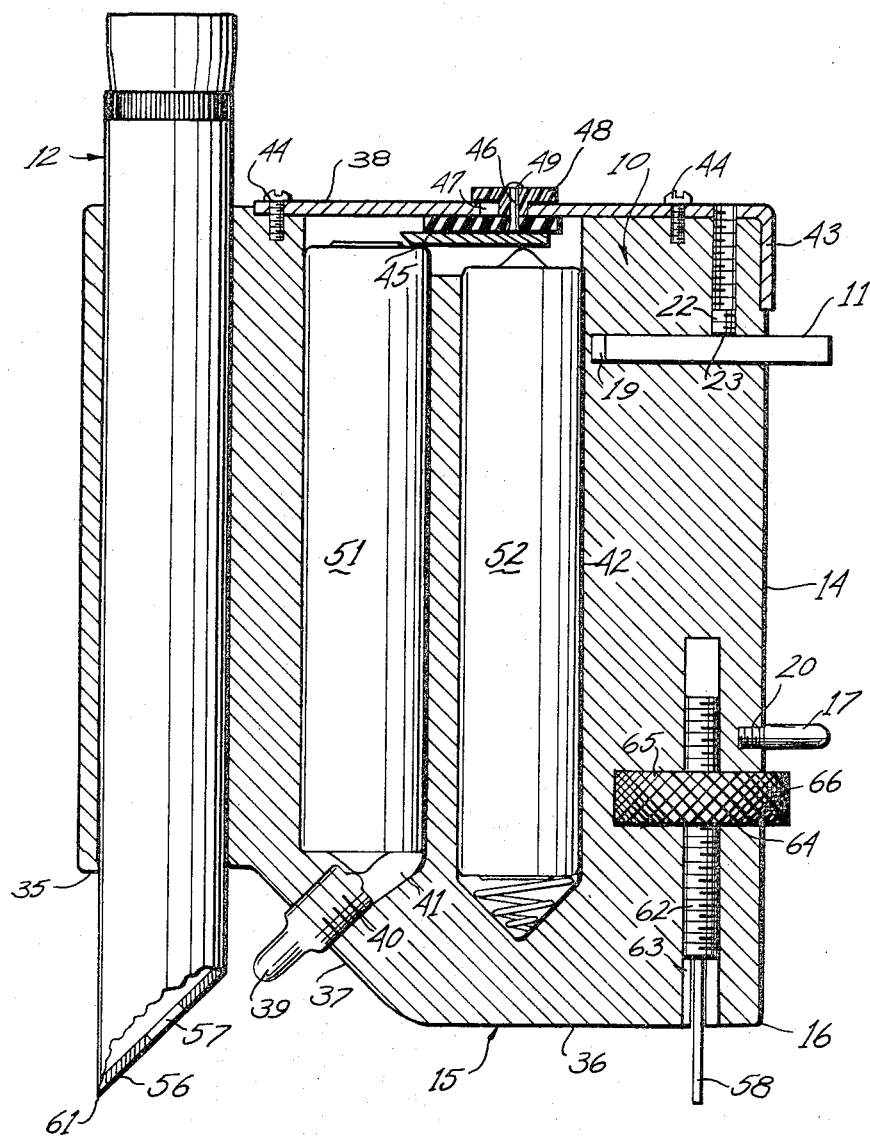
FIG. 2 is a sectional view of the device of the invention taken substantially on line 2—2 in FIG. 1, but with the microscope shown only partially in section.
Figure 3:
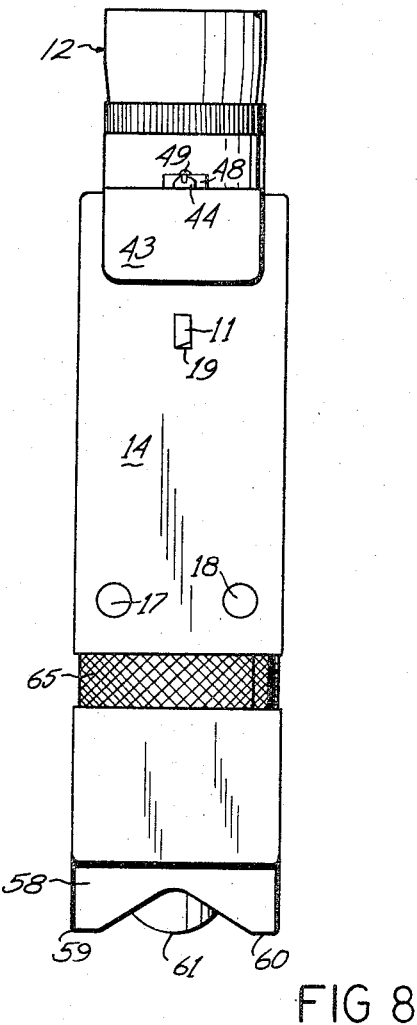
FIG. 3 is an elevational view of the device of the invention showing the cutting tool side of the device.
Figure 9:
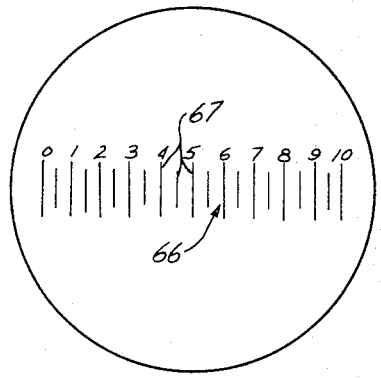
FIG. 9 is a plan view of the reticle of the microscope in the device of the invention.
Figure 8:
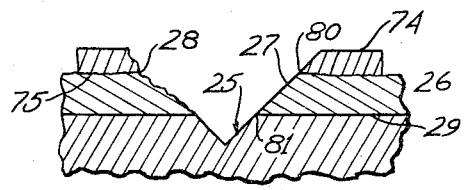
FIG. 8 is a sectional view through a substratum and film on the substratum showing the groove formed in accordance with the method of the invention and by the device of the invention.

These figures and the following detailed description disclose a preferred specific embodiment of the invention, but the invention is not limited to the details disclosed since it may be embodied in other equivalent forms.

Disclosure of an embodiment

The device of the invention comprises a casing 10 from which a cutting tool 11 and a microscope 12 extend. The casing 10 resembles a box, and the device of the invention is best understood by considering the casing 10 as having a cutting tool side 14 and a microscope side 15 which join to form one corner 16 of the casing 10.

A positioning stud 17 and a positioning stud 18 extend from, and perpendicular to, the cutting tool side 14 of the casing 10, and a cutting tool recess 19 extends into the casing 10 from the cutting tool side 14 of the casing 10. The inserted ends of the positioning studs 17 and 18 are threaded, and the positioning studs 17 and 18 are inserted into threaded holes 20 and 21 in the cutting tool side 14 of the casing 10. The positioning studs 17 and 18 are positioned relative to each other and to the cutting tool recess 19 so that the positioning studs 17 and 18 and the cutting tool recess 19 form the corners of a triangle.

One end of the cutting tool 11 is slidably inserted into the cutting tool recess 19; and, when the cutting tool 11 is positioned within the cutting tool recess 19, it extends outwardly from the cutting tool side 14 of the casing 10 with its centerline substantially parallel to the centerlines of the positioning studs 17 and 18. The extent to which the cutting tool 11 extends from the cutting tool recess 19 is adjustably fixed by threadably inserting a set screw 22 through the casing 10 so that rotation of the set screw 22 in opposite directions causes the inserted end 23 of the set screw 22 to engage and disengage the cutting tool 11 within the cutting tool recess 19. This arrangement permits the cutting tool 11 to be easily replaced.

The cutting tool 11 has a point 24 and the point 24 is used to form a groove 25 in a film 26 or similar layer or layers of a material such as paint. The cutting tool 11 is positioned by the set screw 22 so that the cutting tool 11 extends a fixed and predetermined distance from the cutting tool side 14 of the casing 10. The positioning studs 17 and 18 also extend fixed distances from the cutting tool side 14 of the casing 10; and, as a result, when the casing 10 is positioned so that the positioning studs 17 and 18 and the point 24 of the cutting tool 11 engage the film 26, the position of the cutting tool 11 relative to the film 26 is fixed. This is because the position of the cutting tool side 14 of the casing 10 relative to the film 26 determines the position of the cutting tool 11, and because the fixed lengths of the positioning studs 17 and 18 and of the cutting tool 11 fix the position of the cutting tool side 14 of the casing 10 relative to the film 26. Thus, whenever the casing 10 is positioned relative to a film 26 so that the positioning studs 17 and 18 and the point 24 of cutting tool 11 are engaging the film 26, and the casing 10 is moved relative to the film 26, the shape of the groove 25 formed by the point 24 of the cutting tool 11 is determined solely by the shape of the point 24 of the cutting tool 11.

The point 24 of the cutting tool 11 may be shaped to form a groove 25 having any desired characteristics. Set screw 26 permits cutting tools 11 having differently shaped points to be readily interchanged to provide for forming grooves 25 specifically suited to any special material or purpose. In the specific embodiment of the device of the invention described herein, the point 24 of the cutting tool 11 is formed to cut a groove 25 with one side 27 sloping upward at an angle of forty-five degrees to the lower boundary 29 of the film 26. Thus, when the face 30 of the cutting tool 11 is viewed as in FIG. 5, the point 24 of the cutting tool 11 resembles a V. One side of the V is the edge 31 of a channel 32 which extends across the face 30 of the cutting tool 11. The edge 31 is sharpened in known manner to provide a sharp cutting edge for cutting the film 26 as the cutting tool 11 is pulled through a film 26.

The other side 33 of the V is simply the lower end of the channel 32 and does not provide a cutting edge as sharp as that provided by the edge 31. Thus, it will be seen that, although the cutting tool 11 forms a groove 25 having two sloping sides 27 and 28, the side 27 of the groove 25 formed by the edge 31 will be more sharply defined than the side 28 of the groove 25 formed by the side 33 of the point 24. The slope of the side 28 is relatively unimportant, the principle being the provision of an apex of the groove to give clear definition to the one clearly cut side 27.

The channel 32 provides space for material cut from a film 26 by the cutting tool 11 to move upward as the cutting tool 11 is forced through the film 26. The channel 32 further insures that the groove 25 is defined only by the shape of the point 24 since it avoids an accumulation of material from the film 26 in front of the cutting tool 11 which will cause distortion of the groove 25.

The microscope side 15 of the casing 10 has a first horizontal segment 35 and a second horizontal segment 36 substantially perpendicular to the cutting tool side 14 of the casing 10. A canted segment 37 joins the first horizontal segment 35 and the second horizontal segment 36. The first horizontal segment 35 is less distant from the top 38 of the casing 10 than the second horizontal segment 36 and this arrangement permits a bulb 39 extending from the canted segment 37 to be adjacent to the lower end of the microscope 12 as it extends from the first horizontal segment 35.

The bulb 39 is positioned in the canted segment 37 by threadably inserting it into a socket 40 which communicates with a first battery chamber 41, the chamber 41 extending upward within the casing 10 to the top 38 of the casing 10. A second battery chamber 42 extends within the casing 10, from the top 38 of the casing 10, adjacent and parallel to the first battery chamber 41. The upper ends of the battery chambers 41 and 42 are closed by a cover plate 43 which is attached to the top 38 of the casing 10 by screws 44.

A contactor bar 45 is attached to the cover plate 43 by a pin 46 fixedly attached to the contactor bar 45 through a hole 47 in the cover plate 43. The pin 46 has a head 49 at its extending end and the pin 46 is electrically insulated from the cover plate 43 by a flanged collar 48 of electrically nonconductive material such as rubber which surrounds the pin 46 within the hole 47 and extends outwardly to prevent the head 49 of the pin 46 from engaging the cover plate 43. Between the contactor bar 45 and the cover plate 43 is a pad of resilient, electrically nonconductive material such as rubber which serves both to insulate the contactor bar 45 from the cover plate 43 and to urge the contactor bar 45 away from the cover plate 43. The contactor bar 45 is of electrically conductive material such as brass; and, the result of the foregoing arrangement is that when batteries 51 and 52 of known type are placed in known manner in the battery chambers 41 and 42, the contactor bar 45 serves to connect the batteries 51 and 52 electrically. The hole 47 in the cover plate 43 is sufficiently large to permit slidable motion of the pin 46; therefore, the contactor bar 45 can either be disposed, as shown, resting on the insulated covering of the battery 51, or be moved over to connect the metal bottom of the battery 51 to the metal center (positive) pole of the battery 52. Thus, slidable motion of the pin 46 causes the bulb 39 to be lighted or not lighted in known manner.

The microscope 12 is fixedly positioned within the casing 10 with the object end 56 of the microscope 12 extending downwardly beyond the bulb 39 and the second horizontal segment 36. The object end 56 of the microscope 12 is slanted upward toward the bulb 39 so that when the object end 56 of the microscope 12 is placed against a film 26 with the object aperture 57 over a groove 25, light from the bulb 39 will reach the groove 25. The microscope 12 is properly positioned relative to a film 26 by extending a bifurcated plate 58 from the second horizontal segment 36 of the microscope side 15 of the casing 10. The two legs 59 and 60 of the bifurcated plate 58 and the lowermost edge 61 of the microscope 12 provide a three point support for the casing 10 similar to the case support provided by the positioning studs 17 and 18 and the cutting tool 11.

The microscope 12 has an optical axis of known type and the angle which the optical axis of the microscope 12 forms with the film 26 is dependent upon the extent to which the bifurcated plate 58 extends from the microscope side 15 of the casing 10. The bifurcated plate 58 is fixedly attached to the lower end of a threaded bolt 62, the bolt 62 being slidably positioned within a bolt recess 63 extending into the casing 10 from the microscope side 15 of the casing 10. The extent to which the bifurcated plate 58 extends beyond the microscope side 15 of the casing 10 is dependent upon the position of the threaded bolt 62 within the recess 63.

A slot 64 extends into the casing 10 from the cutting tool side 14 of the casing 10 so as to intersect the bolt recess 63, and an adjusting collar 65 is positioned within the slot 64 with the threaded bolt 62 threadably extending through the adjusting collar 65. The edge 66 of the adjusting collar 65 extends from the slot 64, and the slot 64 fixes the position of the adjusting collar 65 relative to the microscope side 15 of the casing 10. When the adjusting collar 65 is rotated, the threaded bolt 62 is raised and lowered relative to the microscope side 15 of the casing 10.

The result of this arrangement is that rotation of the adjusting collar 65 as it extends from the slot 64 causes adjustment of the extent to which the bifurcated plate 58 extends from the microscope side 15 of the casing 10. As the extent to which the bifurcated plate 58 extends from the microscope side 15 of the casing 10 is varied, the microscope 12 pivots on its lowermost edge 61; therefore, when the object aperture 57 of the microscope 12 is placed above a groove 25 formed in a film 26 by the cutting tool 11, the distance of the object aperture 57 from the groove 25 is varied by rotating the adjusting collar 65 so as to place the object aperture 57 in that position which causes the groove 25 to be in focus.

A graduated reticle 66 is positioned within the microscope 12 in known manner; and, when the microscope 12 is in focus over a groove 25, the indicia 67 of the reticle 66 are superimposed on the groove 25 when the groove 25 is viewed in known manner through the microscope 12. The indicia 67 of the reticle 66 are selected using known techniques so that the distance between adjacent indicia 67 represents a vertical distance perpendicularly through the film 26, when the horizontal distance and the vertical distance are considered as the legs of a right triangle and the side 27 is the hypotenuse of the triangle. Thus, when the point 24 of the cutting tool 11 has the configuration described above, the distance between adjacent indicia 67 and the corresponding vertical distance will be equal. This is because the legs of the right triangle form an acute angle of forty-five degrees with the hypotenuse, hence are equal.

For reasons stated above, the side 27 of the groove 25 is substantially identical in slope to the edge 31 of the cutting tool 11 and is sharply defined when viewed through microscope 12. Thus, the distance as seen in the microscope 12 between the intersection 80 of the side 27 of the groove 25 and the lower boundary 29 of the film 26 and the intersection 81 of the side 27 of the groove 25 and the upper boundary 75 of the film 26 will be related to the indicia 67 of the reticle 66 in the same manner as the edge 31. As a result, the thickness of the film 26 is indicated directly by the indicia 67 of the reticle 66.

It will be readily apparent that other relationships between the slope of the edge 31 of the cutting tool 11 and the indicia 67 of the reticle 66 in addition to the relationship described herein are possible. Thus, when extremely thin films 26 are to be examined, the slope of the side 27 may be decreased to provide greater width between the lines of intersections 80 and 81 as viewed in the microscope. When the indicia 67 of the reticle 66 are selected as described above based upon the decreased slope of the side 27, the distance between the lines of intersections 80 and 81 permits the thickness of the film 26 to be directly read.

Thus, when maintaining the proper relationship between the slope of the edge 31 of the cutting tool 11 and the indicia 67 of the reticle 66, the device of the invention permits the thickness of a film to be directly read using the indicia 67 of the scale 66. If the film 26 has a plurality of layers, it is necessary simply to read the distance between the lines of intersections 80 and 81 defined by each layer with the side 27. Moreover, it is readily apparent that means other than the device of the invention may be used to form a groove and read its depth, as indicated by its width. However, regardless of the device used, the method of the invention permits the thickness of a film, or of a layer or plurality of layers of material, to be readily determined.

From the description of the device, the method of the invention should be obvious. A mark, such as a crayon mark 74, is made on the surface of the film 26. A groove 25 is then cut through the crayon mark 74 and the film 26, the groove having at least one side 27 of known slope. Next, the side of known slope of the groove 25 is examined optically to determine the distance between the lines of intersections 80 and 81 of the side 27 and the upper and lower boundaries of the film to be measured. The optical device is graduated according to the relationship between the horizontal and the vertical distance desired so that the vertical distance desired can be read directly. The crayon mark should be of some color or intensity of grey to give good contrast between the mark 74 and the film 26. This makes visual observation through the microscope easier and more accurate.

It will be obvious to those skilled in the art that many variations may be made in the embodiments chosen for the purpose of illustrating the present invention without departing from the scope thereof as defined by the appended claims.

What is claimed is:

1. A method of obtaining data relating to the thickness of a hard flat film over a flat substratum including the steps of
    forming a groove through the film with one side sloped with respect to the surface of the film at a predetermined angle, and
    measuring the distance of the apparent width of the film in the sloped side of the groove in a plane parallel to the surface of the film and in a direction across the length of the groove.

2. A method of determining the thickness of a substantially hard layer of material deposited upon a substratum comprising:
    forming a groove through the layer of material so that one surface of the groove is disposed at a predetermined angle with respect to the surface of the layer of material, and
    measuring in a direction transversely of the groove and in a plane substantially parallel to the surface of the material the apparent width of the exposed portion of the layer of the material in said one surface of the groove.

3. The invention of claim 2 wherein the step of forming a groove through the layer of material includes forming at least one surface of the groove at an angle of 45 degrees with respect to the surface of the material.

4. A method of obtaining data relating to the thickness of a film including the steps of making a mark on a surface of said film, said mark having contrasting optical characteristics to said film, forming a groove through said mark and through said film, said groove having one side with a line of reference sloping so that there is a known relationship between the projection of said line of reference in the plane of said surface and the projection of said line of reference in a plane perpendicular to said plane of said surface, and optically measuring the length of said projection of said line of reference in the plane of said surface.

5. A device for obtaining data relative to the thickness of a substantially hard film, said film having an uppermost surface and a lowermost surface and said device comprising a cutting member having a cutting edge having sufficient length to extend through the film at a predetermined angle to the uppermost surface of the film so as to form a face having its upper edge in the plane of the uppermost surface of the film and its lower edge in the plane of the lowermost surface of the film; means for illuminating said face; and means for measuring the distance between the lower edge of the face and the upper edge of the face in the plane of the uppermost surface of the film, said means including a microscope positionable above said face and having a reticle with indicia.

6. A device for obtaining data relative to the thickness of a substantially hard film, said film having an uppermost surface and a lowermost surface and said device comprising a cutting member having a cutting edge with sufficient length to extend through the film at a predetermined angle to the uppermost surface of the said film so as to form a face having its upper edge in the plane of the uppermost surface of the film and its lower edge in the plane of the lowermost surface of the film; means for illuminating said face; and a microscope positionable over said face and having a reticle with indicia spaced in terms of a first distance parallel to the optical axis of said microscope, said first distance being related to a second distance between adjacent indicia when the first distance and the second distance are considered as the legs of a right triangle having a hypotenuse forming an angle with said optical axis equal to said predetermined angle.

7. A device for determining the thickness of a film including a casing, a cutting tool extending from said casing, said cutting tool having a cutting edge disposed to its axis at a predetermined angle, a microscope extending from said casing and a reticle in said microscope, said reticle having indicia selected in terms of a first distance parallel to the optical axis of the said microscope, said first distance being related to a second distance between adjacent indicia when the first distance and the second distance are considered as the legs of a right triangle having a hypotenuse forming an angle with the optical axis of the microscope equal to the said predetermined angle of said cutting tool.

8. A device for determining the thickness of a film on a substratum including a casing having a cutting tool side and a microscope side, a cutting tool extending with its axis substantially perpendicular to the said cutting tool side of said casing, said cutting tool having a cutting edge disposed to the axis of said cutting tool at a predetermined angle, a pair of positioning studs extending substantially perpendicular from said cutting tool side of said casing, said pair of positioning studs being spaced from said cutting tool to form with said cutting tool a triangular footing for said casing, a microscope disposed in said casing with its optical axis substantially parallel to said cutting tool side and substantially perpendicular to said microscope side, the objective end of said microscope protruding from said microscope side of said casing, a reticle in said microscope, said reticle having indicia spaced in terms of a first distance parallel to the optical axis of said microscope, said first distance being related to a second distance between adjacent indicia when the first distance and the second distance are considered as the legs of a right triangle having a hypotenuse forming an angle with the optical axis of the microscope equal to said predetermined angle, a bifurcated plate adjustably extending from said microscope side of said casing, the end of said microscope and said bifurcated plate providing a triangular footing for said casing.

9. A device for determining the thickness of a film including a casing; a cutting tool extending from said casing, said cutting tool having a face and an outer surface joining said face along a common line at the outermost extremity of said face to form a cutting edge disposed at a predetermined angle to the axis of said cutting tool, said face having a channel coincident with said cutting edge; a microscope extending from said casing; and a reticle in said microscope having indicia spaced in terms of a first distance parallel to the optical axis of said microscope, said first distance being related to a second distance between adjacent indicia when the first distance and the second distance are considered as the legs of a right triangle having a hypotenuse forming an angle with the optical axis of the microscope equal to said predetermined angle.

References Cited

UNITED STATES PATENTS

| | | | |
|---|---|---|---|
| 1,927,821 | 9/1933 | Abbott | 33—169 |
| 2,675,623 | 4/1954 | Lewis et al. | 33—169 |
| 2,839,835 | 6/1958 | Zollinger | 33—169 |
| 2,899,747 | 8/1959 | Weir | 33—1 |
| 3,171,211 | 3/1965 | Parkes et al. | 33—169 |

FOREIGN PATENTS

| | | |
|---|---|---|
| 930,898 | 7/1955 | Germany. |

ROBERT B. HULL, *Primary Examiner.*